United States Patent

Kumagai et al.

Patent Number: 5,611,309
Date of Patent: Mar. 18, 1997

[54] THROTTLE VALVE CONTROL SYSTEM FOR INTERNAL COMBUSTION ENGINES

[75] Inventors: Katsuhiro Kumagai; Tetsuya Ono; Akira Katoh; Kenichiro Ishii, all of Wako, Japan

[73] Assignee: Honda Giken Kogyo Kabushiki Kaisha, Tokyo, Japan

[21] Appl. No.: 560,988

[22] Filed: Nov. 20, 1995

[30] Foreign Application Priority Data

Nov. 22, 1994 [JP] Japan .................................. 6-312458

[51] Int. Cl.⁶ .................................................. F02D 9/02
[52] U.S. Cl. .................................................. 123/399
[58] Field of Search .................................. 123/352, 361, 123/399

[56] References Cited

U.S. PATENT DOCUMENTS 4,791,902  12/1988  Ishikawa et al. ..................... 123/399
4,799,467   1/1989  Ishikawa et al. ..................... 123/399

FOREIGN PATENT DOCUMENTS

56-37414   8/1981  Japan .
60-222331 11/1985  Japan .

Primary Examiner—Tony M. Argenbright
Attorney, Agent, or Firm—Armstrong, Westerman, Hattori, McLeland & Naughton

[57] ABSTRACT

A throttle valve control system for an internal combustion engine installed in a vehicle. A throttle valve opening sensor detects an actual opening of a throttle valve, and an ECU calculates a desired opening of the throttle valve according to the rotational speed of the engine and the required torque of the engine, which is calculated according to operating conditions of the engine and operating conditions of the vehicle, and electrically controls the throttle valve such that the detected actual opening of the throttle valve becomes equal to the desired opening of the throttle valve. An intake pressure sensor detects actual intake pressure within the intake passage, and desired intake pressure within the intake passage is calculated according to the rotational speed of the engine and the required torque of the engine. The desired intake pressure is compared with the detected actual intake pressure, and the desired opening of the throttle valve is corrected based on results of the comparison.

7 Claims, 6 Drawing Sheets

| PBA / NE | PBACMD0 | PBACMD1 | PBACMD2 | PBACMD3 |
|---|---|---|---|---|
| | | LOW LOAD | MEDIUM LOAD | HIGH LOAD |
| NE0 | | | | |
| | | KPACC11 KIACC11 | KPACC12 KIACC12 | KPACC13 KIACC13 |
| NE1 | | | | |
| | | KPACC21 KIACC21 | KPACC22 KIACC22 | KPACC23 KIACC23 |
| NE2 | | ⋮ | ⋮ | ⋮ |
| ⋮ | | | | |
| NE5 | | | | |
| | | KPACC61 KIACC61 | KPACC62 KIACC62 | KPACC63 KIACC63 |
| NE6 | | | | |

FIG.6B

| PBA / NE | PBACMD0 | PBACMD1 | PBACMD2 | PBACMD3 |
|---|---|---|---|---|
| | | LOW LOAD | MEDIUM LOAD | HIGH LOAD |
| NE0 | | | | |
| | | KPDEC11 KIDEC11 | KPDEC12 KIDEC12 | KPDEC13 KIDEC13 |
| NE1 | | | | |
| | | KPDEC21 KIDEC21 | KPDEC22 KIDEC22 | KPDEC23 KIDEC23 |
| NE2 | | ⋮ | ⋮ | ⋮ |
| ⋮ | | | | |
| NE5 | | | | |
| | | KPDEC61 KIDEC61 | KPDEC62 KIDEC62 | KPDEC63 KIDEC63 |
| NE6 | | | | |

THROTTLE VALVE CONTROL SYSTEM FOR INTERNAL COMBUSTION ENGINES

BACKGROUND OF THE INVENTION

1. Field of the Invention

This invention relates to a throttle valve control system for internal combustion engines, and more particularly to a throttle valve control system of this kind, which controls the output torque of the engine, by means of a throttle valve-driving mechanism driven by an electric actuator.

2. Prior Art

A throttle valve control system for internal combustion engines is conventionally known, for example, from Japanese Patent Publication (Kokoku) No. 56-37414, which is provided with an electric actuator for driving a throttle valve of the engine and calculates a desired opening of the throttle valve, based on engine rotational speed and required engine torque, to thereby control the actual throttle valve opening to the desired valve opening.

The known throttle valve control system, however, does not contemplate a time lag factor of a change in the pressure within the intake pipe with respect to a change in the throttle valve opening (time lag due to charging and discharging of air into and from a chamber formed in the intake pipe), and as a result, it can undergo degraded response of the engine torque to the operation of the accelerator pedal. Further, according to the known system, the desired opening of the throttle valve is calculated by the use of a map provided with desired throttle valve opening values which have been experimentally determined according to the engine rotational speed and the required engine torque, which can result in an error in the calculated desired valve opening due to aging of the engine or manufacturing tolerances of the same. As a result, the known throttle valve control system cannot accurately control the actual output torque of the engine to the required torque.

SUMMARY OF THE INVENTION

It is the object of the invention to provide a throttle valve control system for internal combustion engines, which is capable of achieving improved response of the engine torque to the operation of the accelerator pedal, and also capable of accurately controlling the engine torque irrespective of aging of the engine and manufacturing tolerances of the same.

To attain the above object, the present invention provides a throttle valve control system for an internal combustion engine installed in a vehicle, the engine having an intake passage, and a throttle valve arranged in the intake passage, comprising:

desired throttle valve opening-calculating means for calculating a desired opening of the throttle valve according to rotational speed of the engine and required torque of the engine, the required torque being calculated according to operating conditions of the engine and operating conditions of the vehicle;

throttle valve opening-detecting means for detecting an actual opening of the throttle valve;

control means for electrically controlling the throttle valve such that the detected actual opening of the throttle valve becomes equal to the desired opening of the throttle valve;

intake pressure-detecting means for detecting actual intake pressure within the intake passage;

desired intake pressure-calculating means for calculating desired intake pressure within the intake passage according to the rotational speed of the engine and the required torque of the engine; and correcting means for comparing the desired intake pressure with the detected actual intake pressure and for correcting the desired opening of the throttle valve, based on results of the comparison.

Preferably, the correcting means includes means for calculating a difference between the desired intake pressure and the detected actual intake pressure and an integrated value of the difference, means for calculating a first product by multiplying the difference by a predetermined proportional control gain, means for calculating a second product by multiplying the integrated value by a predetermined integral control gain, and means for correcting the desired opening of the throttle valve by the first and second products.

More preferably, the predetermined proportional control gain and the predetermined integral control gain are determined according to the rotational speed of the engine and the desired opening of the throttle valve.

Advantageously, the predetermined proportional control gain and the predetermined integral control gain are determined in a manner depending upon whether the engine is in a predetermined accelerating condition or in a predetermined decelerating condition.

Preferably, the determinations of the predetermined proportional control gain and the predetermined integral control gain are inhibited when a rate of change in the desired opening of the throttle valve is below a predetermined value.

Also preferably, the calculation of the integrated value of the difference is inhibited when the throttle valve is almost fully closed or almost fully open.

Preferably, the throttle valve control system includes means for correcting the required torque of the engine when the engine is in a predetermined high load condition, when exhaust gases emitted from the engine are being recirculated, or when a predetermined load driven by the engine is in an ON state.

The above and other objects, features and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
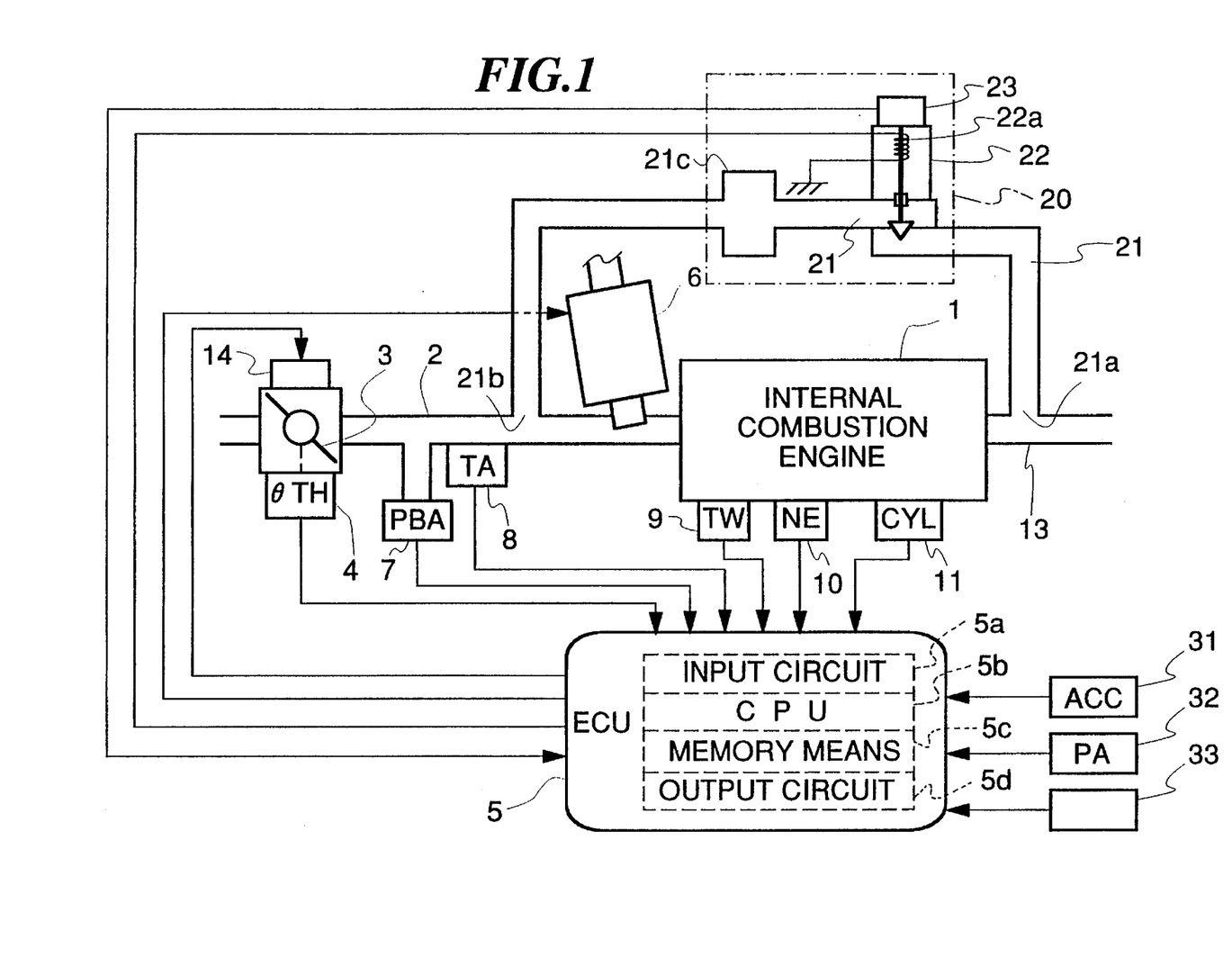
FIG. 1 is a block diagram schematically showing the whole arrangement of an internal combustion engine and a throttle valve control system therefor, according to an embodiment of the invention.

Referring first to FIG. 1, there is illustrated the whole arrangement of an internal combustion engine (hereinafter simply referred to as "the engine") and a control system therefor, including a throttle valve control system according to an embodiment of the invention.

In the figure, reference numeral 1 designates a four-cylinder engine, which has an intake pipe 2 connected to the cylinder block thereof, across which is arranged a throttle valve 3. The throttle valve 3 is mechanically connected to an electric actuator 14 formed, e.g. of an electric motor, to have its valve opening controlled by means of the actuator 14. The actuator 14 is electrically connected to an electronic control unit (hereinafter referred to as "the ECU") 5 which controls the opening of the throttle valve 3 via the actuator 14. A throttle valve opening (θTH) sensor 4 is connected to the throttle valve 3 for generating an electric signal indicative of the sensed throttle valve opening θTH to the ECU 5.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is connected to the intake pipe 2 at a location immediately downstream of the throttle valve 3, for sensing absolute pressure or intake pressure (PBA) within the intake pipe 2, and is electrically connected to the ECU 5 for supplying an electric signal indicative of the sensed absolute pressure PBA to the ECU 5. Further, an intake air temperature (TA) sensor 8 is inserted into the intake pipe 2 at a location downstream of the PBA sensor 7, for supplying an electric signal indicative of the sensed intake air temperature TA to the ECU 5.

An engine coolant temperature (TW) sensor 9, which may be formed of a thermistor or the like, is mounted in the cylinder block of the engine which is filled with coolant, for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, neither of which is shown. The NE sensor 10 generates a signal pulse (hereinafter referred to as "a TDC signal pulse") at each of predetermined crank angles whenever the crankshaft rotates through 180 degrees, while the CYL sensor 11 generates a signal pulse at a predetermined crank angle of a particular cylinder of the engine, both of the pulses being supplied to the ECU 5.

Further connected to the ECU 5 are an accelerator opening position (ACC) sensor 31 for detecting an operating amount of an accelerator pedal (hereinafter referred to as "the accelerator opening position") of a vehicle in which the engine 1 is installed, an atmospheric pressure (PA) sensor 32 for detecting the atmospheric pressure PA, and an ON/OFF switch 33 of an air conditioner, for changing over the ON/OFF conditions of the air conditioner mounted in the vehicle. Signals indicative of the sensed values and the sensed state are supplied to the ECU 5.

The engine is provided with an exhaust gas recirculation (EGR) system.

More specifically, an exhaust gas recirculation passage 20 has one end 21a thereof connected to an exhaust pipe 13 of the engine 1 and the other end 21b thereof connected to the intake pipe 2 at a location downstream of the throttle valve 3, respectively. Arranged across the exhaust gas recirculation passage 21 are an exhaust gas recirculation control valve (hereinafter referred to as "the EGR valve") 22 for controlling a flow rate of exhaust gases to be recirculated, and a volumetric chamber 21C. The EGR valve 22 is formed by an electromagnetic valve having a solenoid 22a electrically connected to the ECU 5, and the valve opening (lift) of the EGR valve 22 is controlled so as to be linearly changed by a signal from the ECU 5. A lift sensor 23 is provided for the EGR valve 22, which detects the opening position (valve lift) of the EGR valve 22, and a signal indicative of the sensed valve lift is supplied to the ECU 5.

The ECU 5 determines operating conditions of the engine, based on engine operating parameters from various sensors including ones mentioned above, and supplies a control signal to the solenoid 22a of the EGR system to make zero a difference between a valve lift command value LCMD of the EGR valve 22, which is set according to the intake pipe absolute pressure PBA and the engine rotational speed NE, and an actual valve lift value LACT of the EGR valve 22, which has been actually detected by the lift sensor 23.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU") 5b, memory means 5c storing various operational programs which are executed by the CPU 5b, and for storing results of calculations therefrom, etc., and an output circuit 5d which outputs driving signals to the actuator 14, etc., respectively.

The CPU 5b calculates required engine torque TEOBJ, as well as a desired valve opening THOBJ of the throttle valve 3, referred to hereinafter, based on engine parameter signals and the accelerator opening position ACC, and controls the actual throttle valve opening θTH such that it becomes equal to the desired valve opening THOBJ. Further, the CPU 5b controls the valve opening periods over which the fuel injection valves 6 are opened, and the valve opening of the EGR valve 22.

Figure 2:
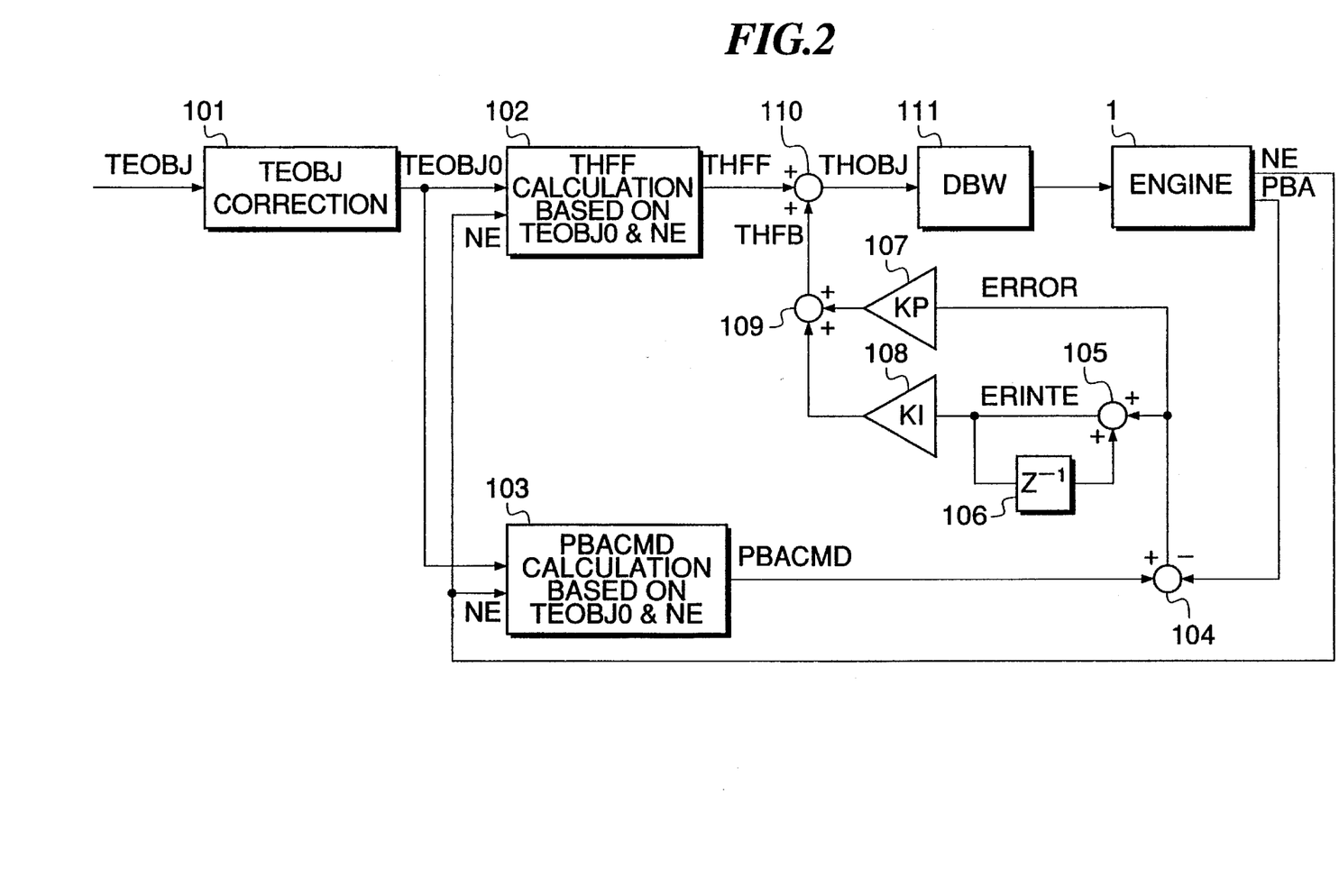
FIG. 2 is a block diagram useful in explaining a manner of calculating a desired opening THOBJ of a throttle valve appearing in FIG. 1, based on required engine torque TEOBJ, according to the embodiment.

Referring next to FIG. 2, description will be made of a manner of calculating the desired valve opening THOBJ of the throttle valve 3, based on the required engine torque TEOBJ according to the present embodiment. Various blocks in FIG. 2 are controlled by the CPU 5b to exhibit their functions. The required engine torque TEOBJ is determined by a routine, not shown, in a manner disclosed, for example, by Japanese Laid-Open Patent Publication (Kokai) No. 60-222331. That is, it is determined according to the accelerator opening position ACC and the engine rotational speed NE, so that the best fuel economy can be obtained. Further, the determination of the required engine torque TEOBJ is carried out by taking into account the ratio between the engine rotational speed NE and the rotational speed of a driving shaft of the vehicle, as well as depending upon whether the engine 1 is in starting mode.

In the figure, a block 101 carries out correction of the required engine torque TEOBJ, by calculating a corrected required engine torque TEOBJO, depending upon whether the air conditioner is in an ON state or an OFF state, whether or not the engine 1 is operating in a WOT (wide open throttle) region, and whether or not EGR (exhaust gas recirculation) is being carried out. Then, a block 102 calculates a basic desired valve opening THFF according to the corrected required engine torque TEOBJO and the engine rotational speed NE, while a block 103 calculates desired intake pressure PBACMD according to the corrected required engine torque TEOBJO and the engine rotational speed NE.

A block 104 subtracts the detected intake pipe absolute pressure PBA from the desired intake pressure PBACMD, to thereby calculate a difference ERROR (=PBACMD−PBA). A block 106, which has a function of delaying input data by one sampling time period, calculates an integrated value ERINTE of the difference ERROR in cooperation with a block 105 which functions as an adder. A block 107 multiplies the difference ERROR by a proportional control gain KP and outputs the resultant product, and a block 108 multiplies the integrated value ERINTE by an integral control gain KI and outputs the resultant product. A block 109 adds together these products (KP×ERROR and KI×ERINTE), to thereby output the resultant sum as a feedback control term (F/B correction value) THFB.

A block 110 calculates the desired valve opening THOBJ by adding together the basic desired opening THFF and the F/B correction value THFB, and a block 111 controls the throttle valve 3 such that the valve opening θTH becomes equal to the desired opening THOBJ.

Figure 3:
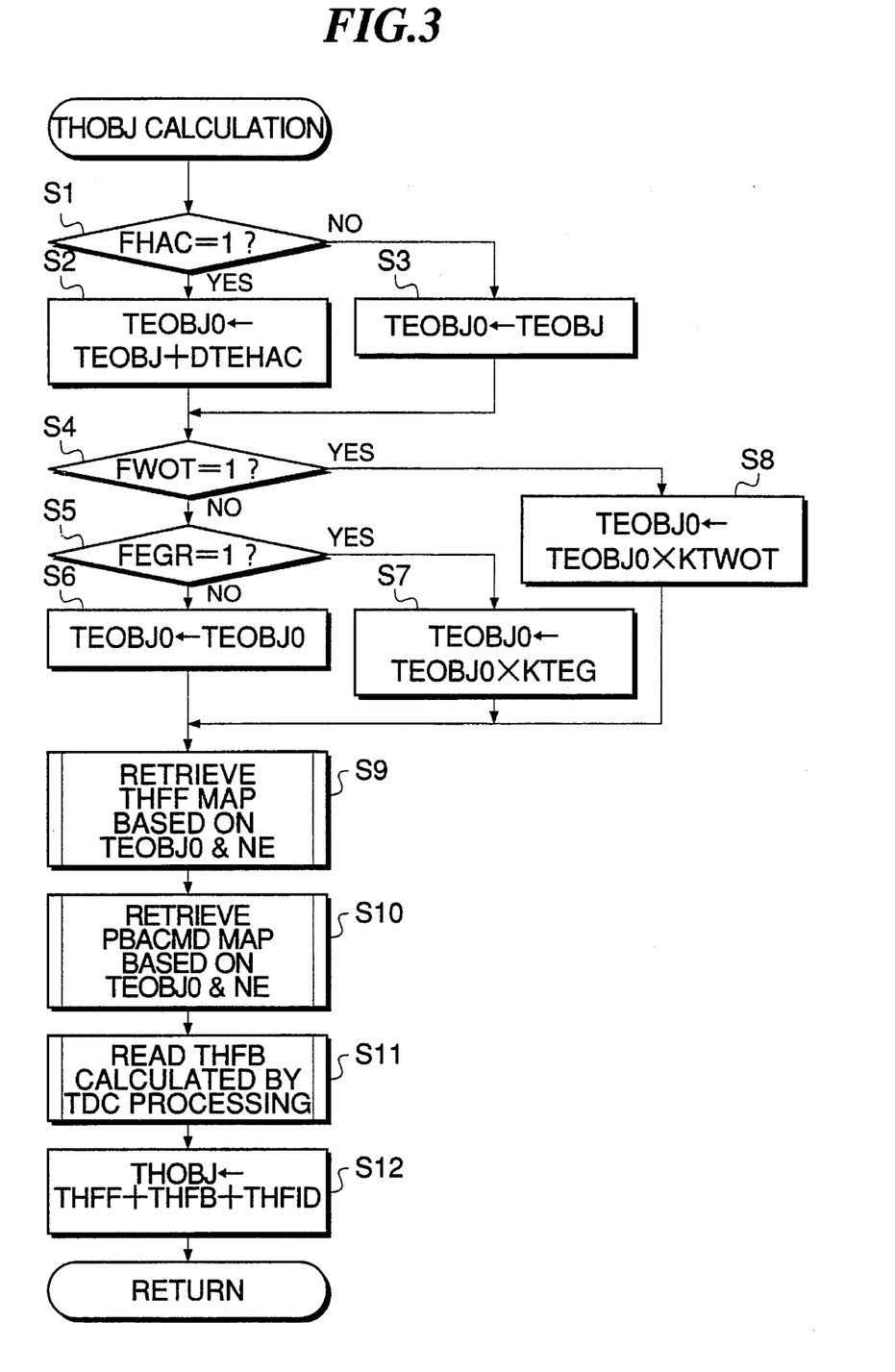
FIG. 3 is a flowchart showing a main routine for calculating the desired opening THOBJ.

FIG. 3 shows a program for carrying out the functions of the blocks shown in FIG. 2, which is executed by the CPU 5b at predetermined time intervals (e.g. 5 msec).

Figure 5A:
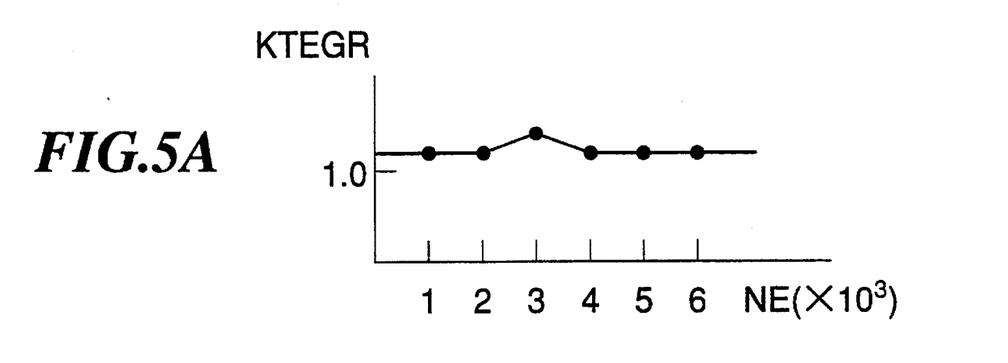
FIGS. 5A to 5C show tables for determining correction coefficients and a correction term which are used in the FIG. 3 program.
Figure 5B:
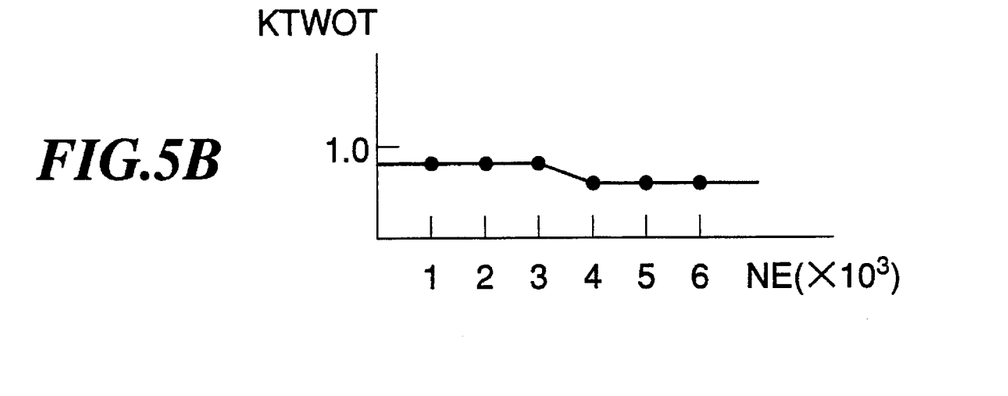
Figure 5C:
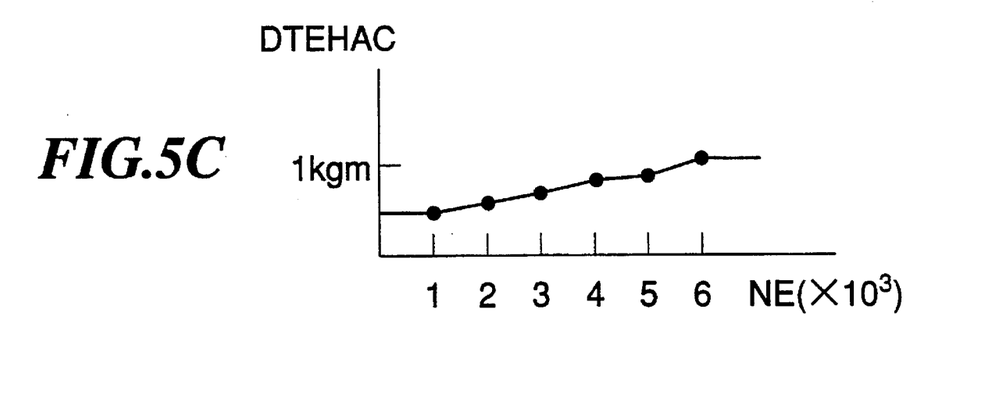

First, at a step S1, it is determined whether or not a flag FHAC is set to "1". The flag FHAC indicates that the air conditioner is in the ON state, when set to "1". If FHAC=0 holds, the required engine torque TEOBJ is directly set to the corrected required engine torque TEOBJO at a step S3, followed by the program proceeding to a step S4. On the other hand, if FHAC=1 holds, the corrected required engine torque TEOBJO is calculated by the use of the following equation (1), followed by the program proceeding to the step S4:

$$TEOBJO=TEOBJ+DTEHAC \tag{1}$$

where DTEHAC represents a correction term applied when the air conditioner is in the ON state, which is set according to the engine rotational speed NE, e.g. by the use of a table of FIG. 5C.

At the step S4, it is determined whether or not a flag FWOT is set to "1". The flag FWOT indicates that the engine is in the WOT region, when set to "1". If FWOT=0 holds, it is further determined at a step S5 whether or not a flag FEGR, which indicates that EGR is being carried out, when set to "1" is set to "1" If FWOT=1 holds, the corrected required engine torque TEOBJO is calculated at a step S8 by the use of the following equation (2), followed by the program proceeding to a step S9. On the other hand, if FEGR=1 holds, the corrected required engine torque TEOBJO is calculated at a step S7 by the use of the following equation (3), followed by the program proceeding to the step S9:

$$TEOBJO=TEOBJO\times KTWOT \tag{2}$$

$$TEOBJO=TEOBJO\times KTEGR \tag{3}$$

where KTWOT represents a high load-dependent correction coefficient which is set according to the engine rotational speed NE, e.g. by the use of a table of FIG. 5B, and KTEGR represents an EGR correction-dependent coefficient which is set according to the engine rotational speed NE, e.g. by the use of a table of FIG. 5A.

If FWOT=FEGR=0 holds, the TEOBJO value is directly set to the TEOBJO value without correction at a step S6, followed by the program proceeding to the step S9.

At the step S9, the basic desired valve opening THFF is determined by retrieving a THFF map according to the corrected required engine torque TEOBJO and the engine rotational speed NE, and then at a step S10, the desired intake pressure PBACMD is determined by retrieving a PBACMD map according to the corrected required engine torque TEOBJO and the engine rotational speed NE. At the following step S11, the F/B correction value THFB which is calculated by a program of FIG. 4, referred to hereinbelow, is read in, and then at a step S12, the desired valve opening THOBJ is calculated by the use of the following equation (4), followed by terminating the present program:

$$THOBJ=THFF+THFB+THFID \tag{4}$$

where THFID represents a desired valve opening applied during fast idling of the engine.

Figure 4:
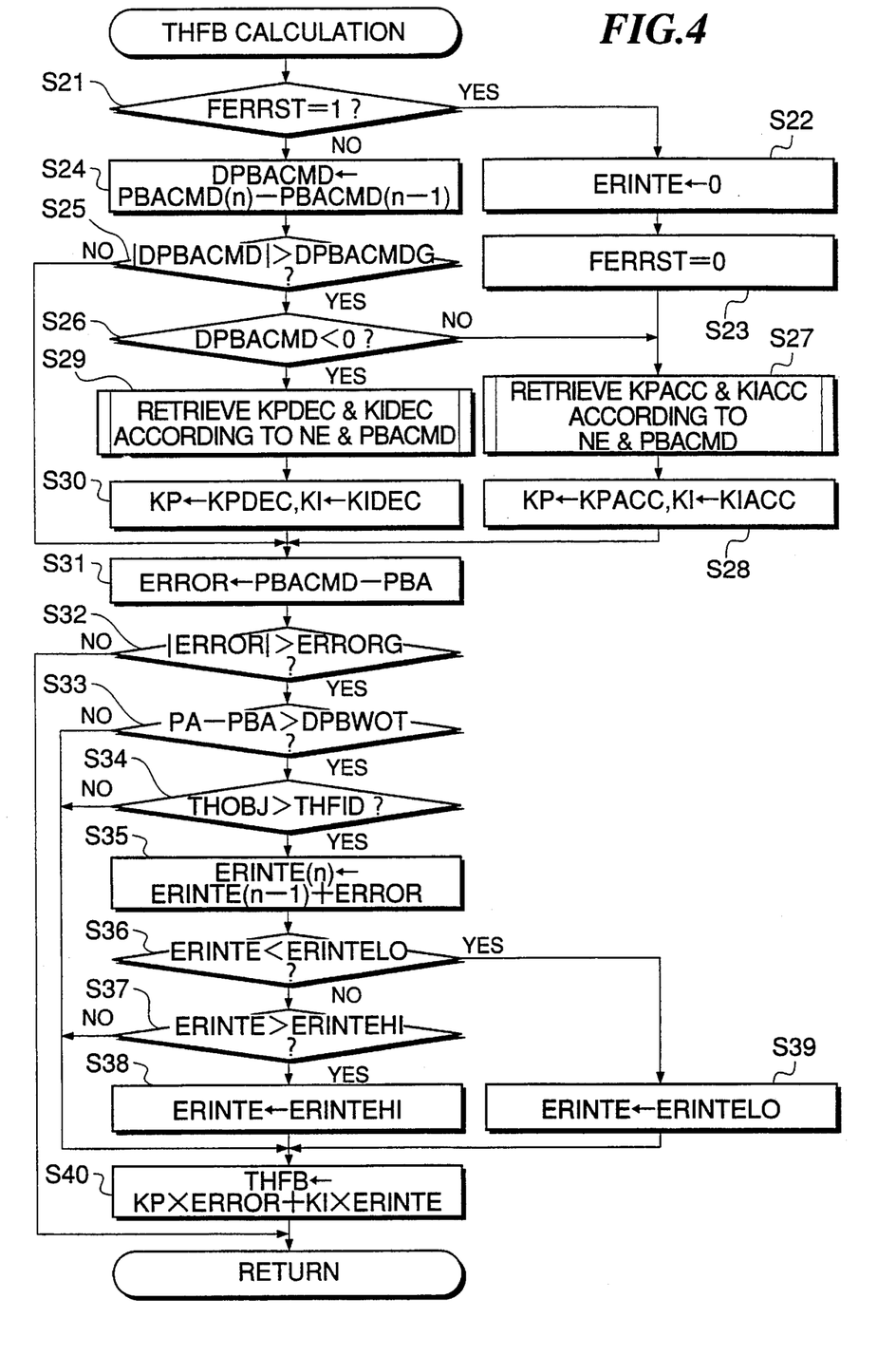
FIG. 4 is a flowchart showing a subroutine for calculating a feedback control term THFB used in calculating the desired opening THOBJ.

FIG. 4 shows a subroutine for calculating the F/B correction value THFB which is read in at the step S11 in FIG. 3, referred to above. This subroutine is executed in synchronism with generation of TDC signal pulses.

First, at a step S21, it is determined whether or not a flag FERRST, which indicates that feedback control of the throttle valve opening has just started, when set to "1" is set to "1". In the first loop of execution of the program, FERRST=1 holds, and then the program proceeds to a step S22, wherein the integrated value ERINTE is set to "0" and then the flag FERRST is set to "0" at a step S23. Then, at a step S27, a control gain map for acceleration is retrieved according to the engine rotational speed NE and the desired intake pressure PBACMD to determine a proportional control gain KPACC for acceleration and an integral control gain KIACC for acceleration. Then, a proportional control gain KP and an integral control gain KI are set to the thus calculated gains KPACC and KIACC, respectively, at a step S28, followed by the program proceeding to a step S31.

Figure 6A:
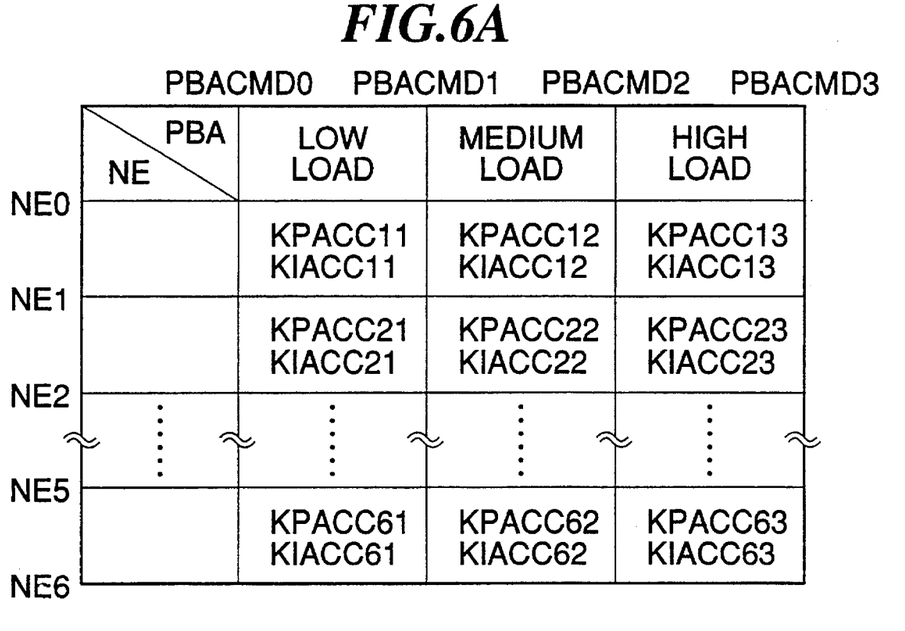
FIGS. 6A and 6B show maps for determining control gains which are used in the FIG. 4 program.

The control gain map for acceleration is set, e.g. as shown in FIG. 6A, such that map values KPACC11 to KPACC63 of the proportional control gain and map values KIACC11 to KIACC63 of the integral control gain are provided for 18 regions defined by six engine rotational speed ranges and three engine load ranges (determined by the desired intake pressure PBACMD). In the figure, NE0 to NE 6 represent predetermined values of the engine rotational speed, and PBACMD0 to PBACMD3 represent predetermined values of the desired intake pressure.

If FERRST=0 holds at the step S21, which means that the present loop is not one immediately after the start of the feedback control, the program proceeds to a step S24, wherein a rate of change DPBACMD in the desired intake pressure PBACMD is calculated by the use of the following equation (5):

$$DPBACMD=PBACMD(n)-PBACMD(n-1) \tag{5}$$

where (n) and (n−1) represent that the values of the concerned parameter have been obtained in the present loop and the immediately preceding loop, respectively.

Then, it is determined at a step S25 whether or not the absolute value of the rate of change DPBACMD is larger than a predetermined threshold value DPBACMDG, and if |DPBACMD|≦DPBACMDG holds, the program jumps to a step S31. On the other hand, if |DPBACMD|>DPBACMDG holds, it is determined at a step S26 whether or not the rate of change DPBACMD is negative. If the rate of change DPBACMD is positive, which means that the desired intake pressure PBACMD is increasing, the program proceeds to the step S27.

On the other hand, if the rate of change DPBACMD is negative, which means that the desired intake pressure PBACMD is decreasing, a control gain map for deceleration is retrieved according to the engine rotational speed NE and the desired intake pressure PBACMD to determine a proportional control gain KPDEC and an integrated control gain KIDEC at a step S29, similarly to the step S27, and the proportional control gain KP and the integral control gain KI are set to the thus calculated control gains KPDEC and KIDEC, respectively, at a step S30, followed by the program proceeding to the step S31.

Figure 6B:
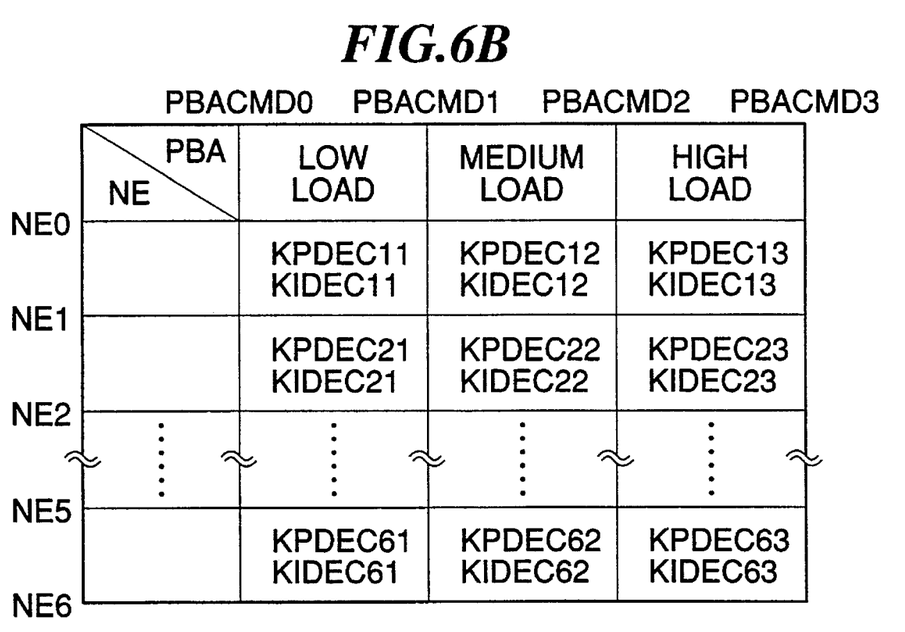

The control gain map for deceleration is set, e.g. as shown in FIG. 6B, similarly to the control gain map for acceleration of FIG. 6A, such that map values KPDEC11 to KPDEC63 of the proportional control gain and map values KIDEC11 to KIDEC63 of the integral control gain are provided for 18 regions defined by six engine rotational speed NE ranges and three engine load ranges (determined by the desired intake pressure PBACMD).

At the step S31, the difference ERROR between the desired intake pressure PBACMD and the actually detected intake absolute pressure PBA is calculated by the use of the following equation (6):

$$ERROR = PBACMD - PBA \quad (6)$$

Then, it is determined at a step S32 whether or not the absolute value |ERROR| of the difference ERROR is larger than a predetermined very small value ERRORG, and if |ERROR|>ERRORG holds, which means that the difference ERROR is almost zero, the present program is immediately terminated to prevent hunting of the control.

If |ERROR|>ERRORG holds, it is determined at a step S33 whether or not a pressure difference (PA-PBA) between the atmospheric pressure PA and the intake pipe absolute pressure PBA is larger than a predetermined very small pressure value DPBWOT. If (PA-PBA)>DPBWOT holds, it is further determined at a step S34 whether or not the desired valve opening THOBJ of the throttle valve is larger than the desired valve opening THFID for fast idling. If (PA-PBA)≦DPBWOT holds, i.e. if the throttle valve 3 is almost fully open, or if THOBJ≦THFID holds, i.e. if the throttle valve 3 is almost fully closed, the program jumps over steps S35 to S39 to a step S40 without calculating the integrated value ERINTE, i.e. by maintaining the integrated value at the immediately preceding value thereof.

If the answer to the question of the step S34 is affirmative (YES), i.e. if THOBJ>THFID holds, the program proceeds to the step S35, wherein the integrated value ERINTE(n) of the difference ERROR is calculated by the use of the following equation (7):

$$ERINTE(n) = ERINTE(n-1) + ERROR \quad (7)$$

where (n) and (n-1) represent that the desired intake pressure assumes the present value and the immediately preceding value, respectively. If no (n) or (n-1) is affixed, the integrated value indicates the present value.

At the following steps S36 to S39, limit-checking of the integrated value ERINTE calculated as above is carried out. More specifically, the integrated value ERINTE is compared with predetermined upper and lower limit values ERINTEHI and ERINTELO at the steps S36 and S37, and if ERINTELO≦ERINTE≦ERINTEHI holds, the program immediately proceeds to the step S40. On the other hand, if ERINTE<ERINTELO holds, the integrated value ERINTE is set to the lower limit value ERINTELO at the step S39, while if ERINTE>ERINTEHI holds, the integrated value is set to the higher limit value ERINTEHI at the step S38, followed by the program proceeding to the step S40.

At the step S40, the F/B correction value THFB is calculated by the use of the following equation (8), followed by terminating the present routine:

$$THFB = KP \times ERROR + KI \times ERINTE \quad (8)$$

As described above, according to the present embodiment, the desired intake pressure PBACMD calculated according to the engine rotational speed NE and the corrected required engine torque TEOBJO, and the difference ERROR between the thus calculated PBACMD value and the actually detected intake pipe absolute pressure PBA is calculated. Further, the F/B control term (F/B correction value) THFB is calculated by the PI control based on the above obtained difference ERROR, and the basic desired opening value THFF is corrected by the thus calculated F/B control term THFB. As a result, the response of the engine torque to the operation of the accelerating pedal can be improved, and the output torque of the engine 1 can be accurately controlled to the required engine torque irrespective of changes in the engine due to aging and manufacturing tolerances of the same.

What is claimed is:

1. A throttle valve control system for an internal combustion engine installed in a vehicle, said engine having an intake passage, and a throttle valve arranged in said intake passage, comprising:

desired throttle valve opening-calculating means for calculating a desired opening of said throttle valve according to rotational speed of said engine and required torque of said engine, said required torque being calculated according to operating conditions of said engine and operating conditions of said vehicle;

throttle valve opening-detecting means for detecting an actual opening of said throttle valve;

control means for electrically controlling said throttle valve such that said detected actual opening of said throttle valve becomes equal to said desired opening of said throttle valve;

intake pressure-detecting means for detecting actual intake pressure within said intake passage;

desired intake pressure-calculating means for calculating desired intake pressure within said intake passage according to said rotational speed of said engine and said required torque of said engine; and correcting means for comparing said desired intake pressure with said detected actual intake pressure and for correcting said desired opening of said throttle valve, based on results of said comparison.

2. A throttle valve control system as claimed in claim 1, wherein said correcting means includes means for calculating a difference between said desired intake pressure and said detected actual intake pressure and an integrated value of said difference, means for calculating a first product by multiplying said difference by a predetermined proportional control gain, means for calculating a second product by multiplying said integrated value by a predetermined integral control gain, and means for correcting said desired opening of said throttle valve by said first and second products.

3. A throttle valve control system as claimed in claim 2, wherein said predetermined proportional control gain and said predetermined integral control gain are determined according to said rotational speed of said engine and said desired opening of said throttle valve.

4. A throttle valve control system as claimed in claim 3, wherein said predetermined proportional control gain and said predetermined integral control gain are determined in a manner depending upon whether said engine is in a predetermined accelerating condition or in a predetermined decelerating condition.

5. A throttle valve control system as claimed in claim 3, wherein said determinations of said predetermined proportional control gain and said predetermined integral control gain are inhibited when a rate of change in said desired opening of said throttle valve is below a predetermined value.

6. A throttle valve control system as claimed in claim 3, wherein said calculation of said integrated value of said difference is inhibited when said throttle valve is almost fully closed or almost fully open.

7. A throttle valve control system as claimed in claim 1, including means for correcting said required torque of said engine when said engine is in a predetermined high load condition, when exhaust gases emitted from said engine are being recirculated, or when a predetermined load driven by said engine is in an ON state.

* * * * *